(12) United States Patent
Kaufthal

(10) Patent No.: US 10,664,218 B2
(45) Date of Patent: May 26, 2020

(54) HOLOGRAPHIC AUGMENTED AUTHORING

(71) Applicant: Microsoft Technology Licensing, LLC, Redmond, WA (US)

(72) Inventor: Jonathan Kaufthal, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/369,652

(22) Filed: Mar. 29, 2019

(65) Prior Publication Data

US 2019/0227763 A1 Jul. 25, 2019

Related U.S. Application Data

(63) Continuation of application No. 15/154,288, filed on May 13, 2016, now Pat. No. 10,318,225.

(60) Provisional application No. 62/213,089, filed on Sep. 1, 2015.

(51) Int. Cl.
| | |
|---|---|
| *G06F 3/14* | (2006.01) |
| *G06F 3/0481* | (2013.01) |
| *G06F 3/0482* | (2013.01) |
| *G02B 27/01* | (2006.01) |
| *G06F 3/01* | (2006.01) |
| *G06F 3/048* | (2013.01) |
| *G03H 1/00* | (2006.01) |
| *G06T 19/00* | (2011.01) |
| *G09G 3/00* | (2006.01) |
| *G06F 40/10* | (2020.01) |

(52) U.S. Cl.
CPC ....... *G06F 3/1423* (2013.01); *G02B 27/0103* (2013.01); *G02B 27/0172* (2013.01); *G03H 1/00* (2013.01); *G06F 3/011* (2013.01); *G06F 3/048* (2013.01); *G06F 3/0482* (2013.01); *G06F 3/04817* (2013.01); *G06T 19/006* (2013.01); *G02B 2027/0134* (2013.01); *G02B 2027/0138* (2013.01); *G02B 2027/0174* (2013.01); *G02B 2027/0187* (2013.01); *G03H 2001/0061* (2013.01); *G06F 3/04815* (2013.01); *G06F 40/10* (2020.01); *G09G 3/003* (2013.01); *G09G 2354/00* (2013.01)

(58) Field of Classification Search
CPC ....................................................... G06F 3/1454
USPC ........................................................... 715/761
See application file for complete search history.

(56) References Cited

U.S. PATENT DOCUMENTS

| | | | |
|---|---|---|---|
| 10,001,645 B2 * | 6/2018 | Norden ................. | G02B 27/01 |
| 2016/0027216 A1 * | 1/2016 | da Veiga ............ | G02B 27/0172 |
| | | | 345/419 |
| 2016/0306600 A1 * | 10/2016 | Shibata ................. | G06F 3/1423 |

* cited by examiner

*Primary Examiner* — Thomas J Lett
(74) *Attorney, Agent, or Firm* — Talem IP Law, LLP

(57) ABSTRACT

Holographic augmented authoring provides an extension to personal computing experiences of a universal or conventional productivity application. A user interface of a productivity application executing on a personal computing device can be switched from a touch or conventional mode to a holographic mode, which opens communication between the personal computing device and a holographic enabled device providing a mixed reality system. A semantic representation of a command in a productivity application is generated as a hologram in a mixed reality system and the change to a content file from performing the command in the mixed reality system does not require a holographic enabled device to view or even further edit.

20 Claims, 14 Drawing Sheets

HOLOGRAPHIC AUGMENTED AUTHORING

CROSS-REFERENCE TO RELATED APPLICATION(S)

This application is a continuation application of U.S. application Ser. No. 15/154,288, filed May 13, 2016, which claims the benefit of U.S. Provisional Application Ser. No. 62/213,089, filed Sep. 1, 2015.

BACKGROUND

Various technologies have emerged that allow users to experience a blend of reality and virtual worlds. For example, handheld mobile devices (e.g. smart phones, tablet computers, etc.), may be configured to display a virtual reality environment to a user in the field of view of the user and/or a field of view of a camera of the device. In some cases, information may be displayed using a camera viewfinder window.

As another example, head-mounted display (HMD) devices may include high definition cameras, depth cameras, range finders, gyroscopes, accelerometers, and other technologies that allow the HMD device to map the real world and to display a blend of virtual objects and reality on the HMD device. Certain HMD devices, including Microsoft® HoloLens, may include stereoscopic displays that use stereopsis to achieve 3D visuals, or holograms, by displaying separate images with appropriately translated positions to each eye of the user.

BRIEF SUMMARY

Holographic augmented authoring is disclosed. A mixed reality system is provided that includes holographic modes for productivity applications. Additional functionality and commands are included in productivity applications that enable content authoring that persists in a document consumable by non-holographic enabled productivity application.

In one embodiment, a holographic-enabled device and a second computing device communicate over wired or wireless connections to execute a user session of a productivity application. The holographic-enabled device can include at least a software component of the productivity application and the second computing device can include the productivity application. The second computing device, when executing the productivity application, displays a content file in an authoring interface for the productivity application; and in response to receiving an indication of holographic mode, enables communication between the second computing device and the holographic computing device to provide holographic augmented authoring of the content file.

The holographic-enabled device, when executing the software component of the productivity application, receives the at least one content component of the content file and communicates information corresponding to at least one of new or modified content, command features, application configuration, interface configuration, and layout features. The software component of the productivity application executed at the holographic-enabled device and the productivity application executed at the second computing device can communicate with each other via application programming interfaces.

Communication between the holographic-enabled device and the second computing device enables manipulation and movement of holographic images onto and of off a graphical user interface displayed at the second computing device. In many cases, the holographic-enabled device executing the software component of the productivity application provides at least one holographic authoring command corresponding to a semantic representation of an authoring command that can be enacted on at least one content component of the content file.

In another embodiment, an instance of a productivity application can be executed on a holographic-enabled device. The holographic-enabled device executing the instance of the productivity application, provides at least one holographic authoring command corresponding to a semantic representation of an authoring command that can be enacted on at least one content component of a content file. A modification can be made to the content file by executing one or more of the at least one holographic authoring command corresponding to the semantic representation of the authoring command. The modified content file can be saved locally at the holographic-enabled device and uploaded to synchronize with a persisted content file at a remote storage location.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Holographic augmented authoring is disclosed.

Virtual reality, augmented reality, and mixed reality technologies have generally focused on entertainment and graphics intensive scenarios. These technologies have also been explored for use in training for medical and military scenarios. However, one area where these technologies have not yet impacted is in general productivity such as available for productivity application providing content authoring functionality.

Virtual reality refers to a fully immersive experience. For example, a user put son a headset and everything in the user's field of view is a pixel.

Augmented reality refers to an experience in which reality is supplemented with additional information such as available on a heads-up display, simple overlay, or on a mobile device. For example, odometer and speed values may be provided in a vehicle via a transparent head-up display including a high quality projector and IR camera. As another example of augmented reality, a user can hold up their phone, executing an augmented reality application, in front of a store and get a phone number or additional information for the store based on the location of the device. The digital information is displayed on a particular screen.

Mixed reality takes augmented reality one step further so that not only is the real world and the digitally represented world available, the digitally represented objects interact with the real world element. That is, holograms can be rendered in the real world and appear to interact with objects in the physical world. For example, in a game, a character can obey the physics of the physical items in the environment. In this example, a table or couch in the real world would be identified by a mixed reality system and taken into consideration when moving the character around the room so that the character could sit on the couch and avoid walking into the table. Another example of mixed reality is to be able to take a component and anchor it to a spot, for example against a wall.

A productivity application can run on a holographic-enabled device in a similar manner to any other computing device; however, on the holographic-enabled device, the graphical user interface for the productivity application can be anchored to an object in the room or be made to follow the user of the holographic-enabled device. When implementing the holographic-enabled device as a head-mounted display system, gaze, gesture, and/or voice can be used instead of a mouse, keyboard or touch.

The combination of natural user interface (NUI) elements and holographic capabilities are applied herein for enhancing productivity and content authoring.

A mixed reality system is provided that includes holographic modes for productivity applications. Additional functionality and commands are included in productivity applications that enable content authoring that persists in a document consumable by non-holographic enabled productivity application.

Figure 1A:
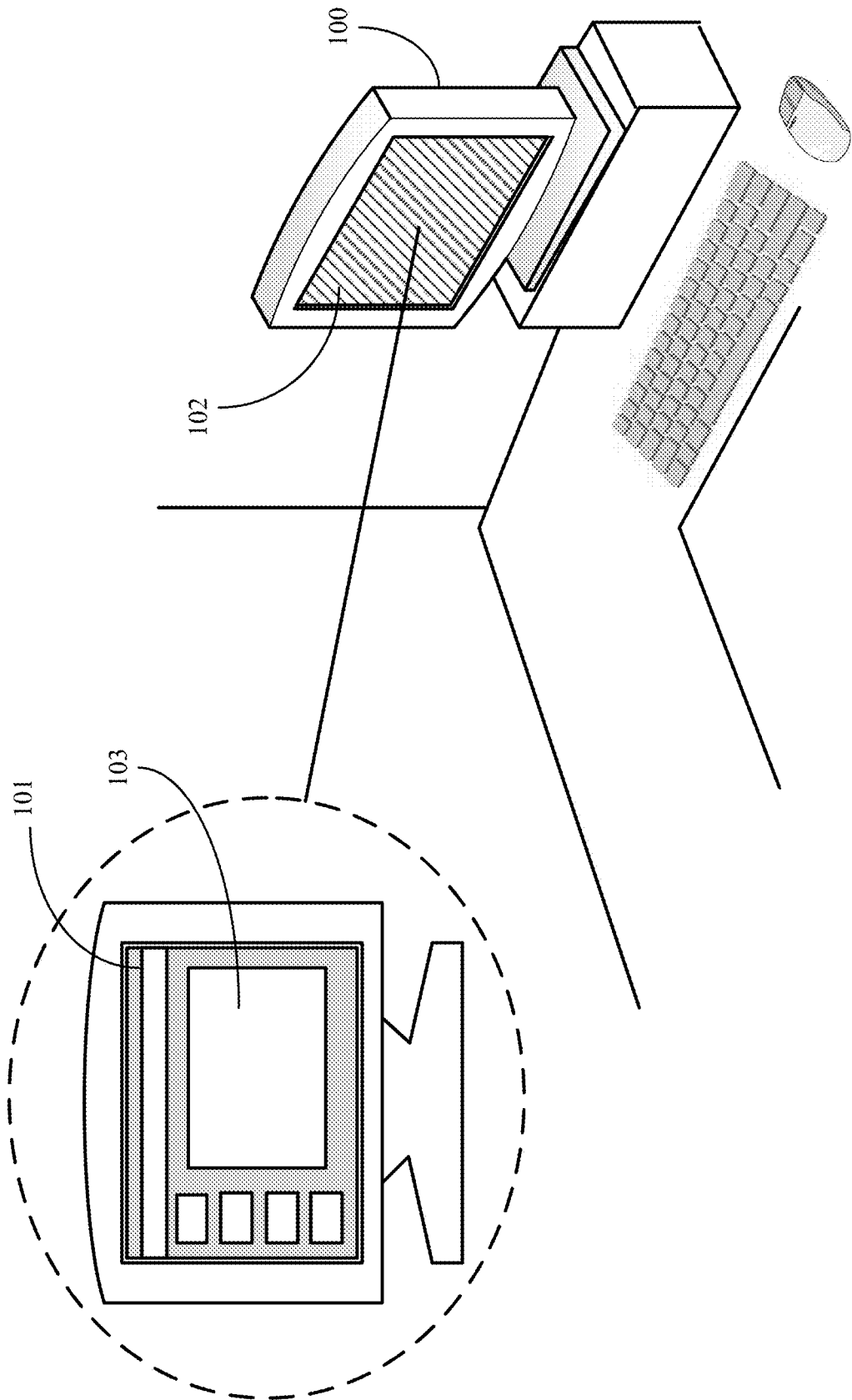
FIGS. 1A-1B illustrate a mixed reality technology in which holographic augmented authoring can be carried out.
Figure 1B:
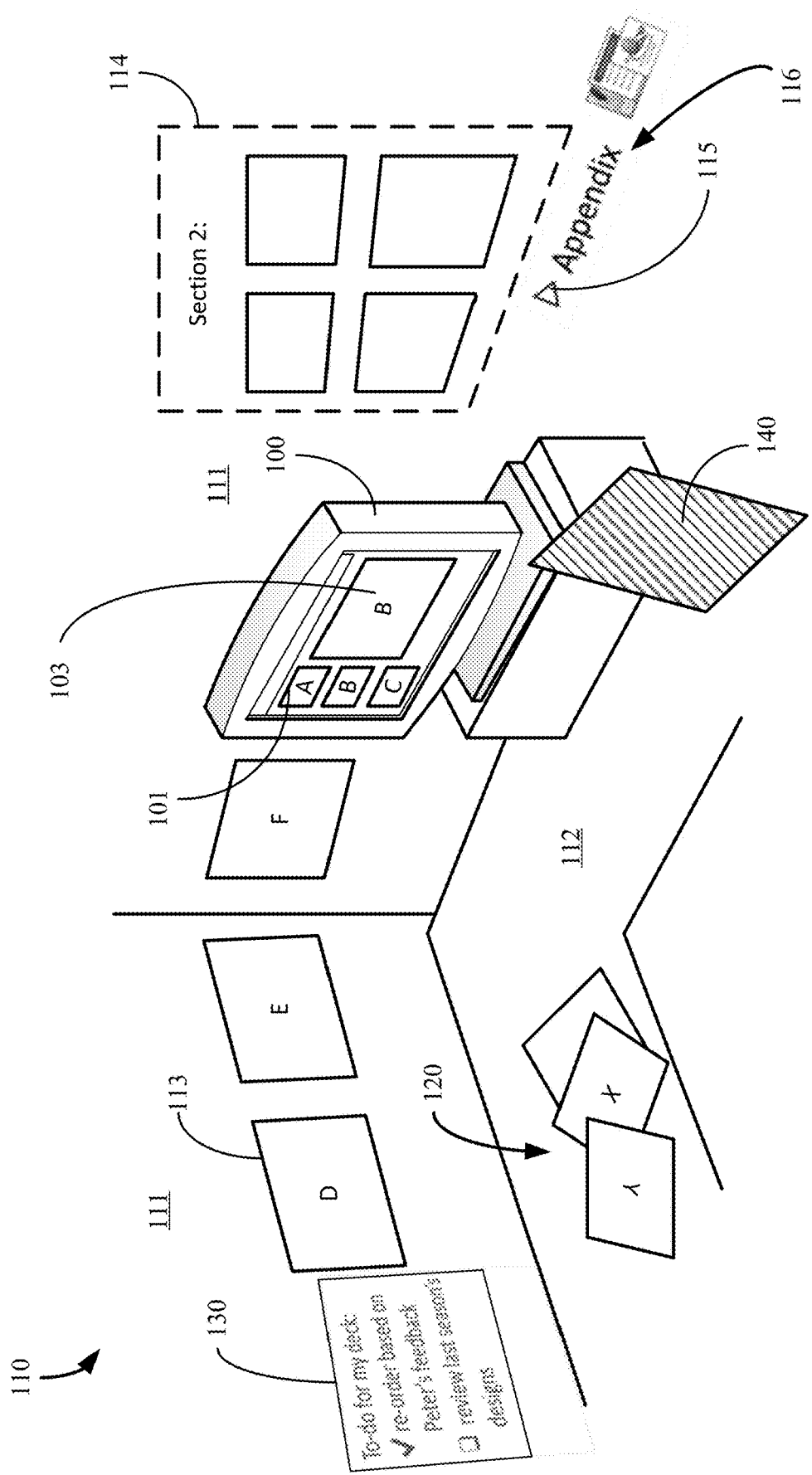

FIGS. 1A-1B illustrate a mixed reality technology in which holographic augmented authoring can be carried out. As an initial scenario, as shown in FIG. 1, a user may sit down to work at their desk using a computing device 100 such as described with respect to FIG. 7. Here, a productivity application, such as a presentation application, can be running on the computing device 100. The graphical user interface 101 of the productivity application is displayed on a display 102 of the computing device 100 and shows a normal editing mode for slides 103.

This general productivity application experience can then be augmented as shown in FIG. 1B. Referring to FIG. 1B, by using a holographic enabled device, the user can enhance the traditional two-dimensional experience and expand productivity application features into their real physical workspace 110 including surfaces such as walls 111 and desk 112. Visual components can move off of the computing device 100 and into the workspace 110 and vice versa. Single holographic slides 113 and other content components may be arranged and anchored in the workspace. In addition, section components 114 (that can contain sub components including content components) can be arranged and anchored in the workspace. Certain commands may be displayed in the workspace, for example, a navigation command 115 can be included to control a visual component such as a section component labeled "Appendix" 116 so that the Appendix 116 expands or collapses in view. The expanding of the Appendix 116 may collapse the section component 114. Alternatively, another navigation command (not shown) may be included to collapse/expand the section component 114 separately from other sections like the Appendix 116.

As an illustrative scenario, a user, Angela, is working on a presentation using a presentation application running on her computing device 100. She can wear a holographic enabled device implemented as a head mounted device (HMD) and gaze at the display 102 of her computing device 100 and say "expand presentation." Off to the left are single slides 113 D, E, and F and to her right are the slides in a section component 114 for Section 2. Slides 103 A, B, and C may remain visible in the graphical user interface 101 of the application running on her computing device 100. In some cases, the previous and/or next slides can be "floating" around the area of primary focus, e.g., the actual display 102 of the computing device 100. For example, where slide "B" 103 is visible in the on the display 102, slide "A" can be to her left such as where the "F" slide is provided with the single slides 113, and slides "C" and "D", etc. can be to her right (off the screen). In one of such cases, the thumbnail slides A, B, and C shown in the graphical user interface 101 are omitted since those slides are expanded beyond the display 102. As part of the holographic augmented authoring, Angela can move holographic slides into a pile 120 indicating discarded slides. From this pile 120, she may pick back up a slide or leave as if 'on the cutting room floor'.

Some functionality that can be available in the illustrated scenario includes using the computing device 100 as normal and then pushing the mouse of the screen and into the real world to grab and rearrange holograms. The user, Angela, can look at a slide and say copy, delete, move, or even "slide sorter". She can use a real whiteboard in the workspace to annotate a current slide anchored to that whiteboard, scroll to the next slide, and have it all synchronize back to the saved presentation. She can pick up section component 114 Section 2 from the wall 111 and spread it across her desk 112. She can even 'toss' one of the slides into a trash can (and this action can be interpreted as 'delete').

In addition to components from a single application, other software features can be brought out to the workspace by using a holographic enabled device. For example, documents, a to-do list 130, or even additional content authoring tools 140 such as productivity application-enabled search of networked and/or Internet resources can be provided in the expanded work environment enabled by the holographic-enabled device.

The holographic enabled device and communication between the holographic enabled device and the computing device 100 can facilitate productivity and expand the workspace.

The holographic enabled device can allow a user to perform certain productivity tasks using holograms instead of print-outs. Not only are the pages, slides and other pieces of content provided for interaction as if they were on a physical piece of paper and moved about a work space, but changes made to these content components are reflected and understood by the productivity application to result in a change to the content file.

Figure 2A:
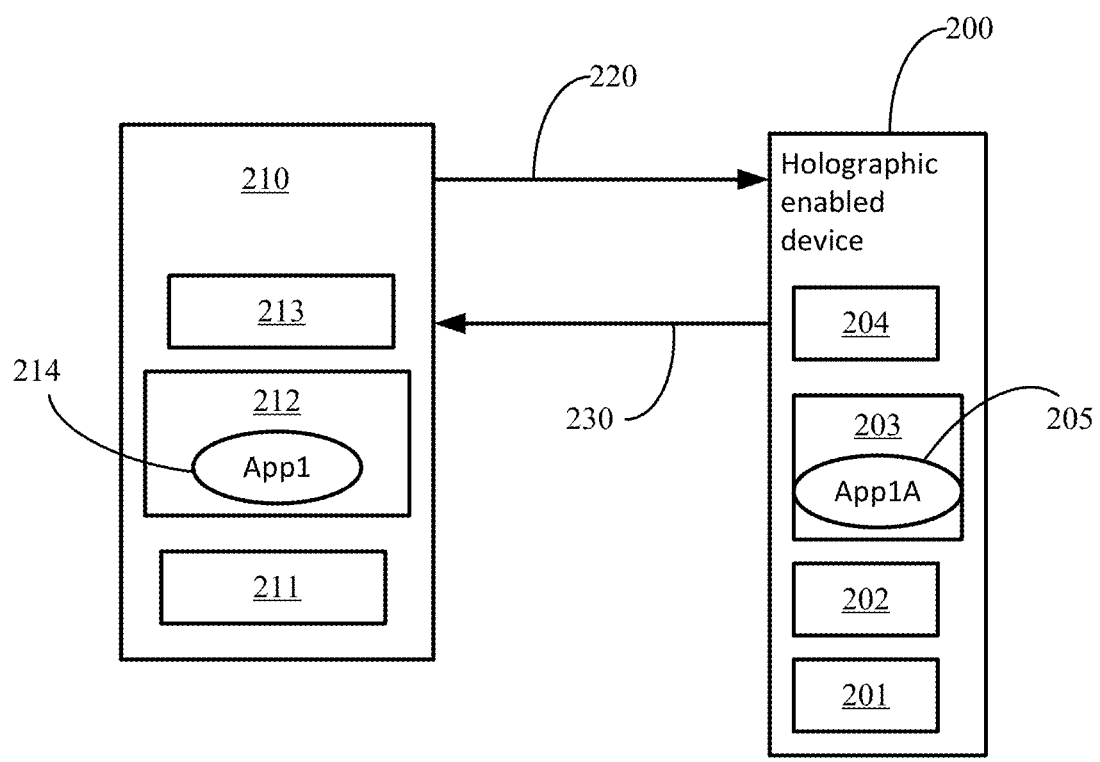
FIG. 2A illustrates an operational environment for an example implementation of holographic augmented authoring.

FIG. 2A illustrates an operational environment for an example implementation of holographic augmented authoring. A holographic enabled device 200, which may embody computing system 600 described with respect to FIG. 6, and a computing device 210, which may embody computing system 700 described with respect to FIG. 7, can communicate with each other to implement the example scenario illustrated and described with respect to FIGS. 1A and 1B.

The holographic-enabled device 200 can include at least a holographic display 201, a processor 202, storage media 203, a communication interface 204 (e.g., supporting a wired communication or wireless communications such as Bluetooth, Wi-Fi, or other near-field communication); and at least a software component 205 of a productivity application stored on the storage media 203. The holographic enabled device 200 can generate holograms that are viewable via the holographic display 201.

The computing device 210 can include at least a processor 211, storage media 212, a communication interface 213 (e.g., supporting a wired communication or wireless communications such as Bluetooth, Wi-Fi, or other near-field communication), and the productivity application 214 stored on the second storage media 212.

In some cases, the software component 205 is part of the productivity application 214 that is executed on the holographic enabled device 200. In some cases, the software component 205 includes instructions for communicating with a productivity application running on another device, for example, in the form of a mini-application programming interface. In some cases, the software component 205 is a separate instance from the productivity application 214 and includes all or only a portion of the features available in the productivity application 214 in addition to the holographic commands.

The productivity application 214 when executed by the computing device 210, directs the processor 211 to display a content file in an authoring interface for the productivity application 214. The user may interact with the authoring interface and use the productivity application 214 to author (e.g., create, read, update, delete) content in the content file. In addition to traditional authoring interfaces commonly associated with mouse and keyboard input, there may be additional authoring interfaces that are optimized for different form factor devices and different input capabilities. For example, a productivity application may have a touch-mode interface for use with a touch screen, which can change arrangement and/or availability of certain commands.

For the holographic augmented authoring, the productivity application 214 can include a holographic mode interface. In some cases, in response to receiving an indication of holographic mode, for example by receiving a command from an input device to the computing device 210 or even by receiving a command from the holographic enabled device 200, communication between the computing device 210 and the holographic-enabled device 200 can be initiated to provide holographic augmented authoring of the content file.

Therefore, if the selection of the mixed-reality augmented mode (the holographic mode) is performed at the computing device 210, productivity application 214 can be ready to communicate with a holographic-enabled device and send information 220 such as content and other aspects of the content file or the productivity application to the holographic-enabled device. In some cases, the user can send commands to the holographic enabled device via the productivity application 214.

The software (as part of component 205) on the holographic enabled device 200 and the software (as part of application 214) on the computing device 210 can communicate (in some manner through communication interfaces 204 and 213) to transform content components (for both dynamic and static content) in a content file to the universe/workspace around the user. Dynamic content includes content that is updated over time (and changes based on another program as opposed to the user making a change), for example, from an RSS feed or video. Static content includes content that, unless actively modified within the content file by a use, will remain.

The particular components from a content file that can be moved from the computing device 210 to the holographic enabled device 200 and shown in a workspace (such as workspace 110) can be specifically selected portions of content and/or the atomic pieces that one would identify as an object in a particular productivity application. In some cases, a separate service may be used to identify the particular components and sub-components of content that can be pulled out as a whole piece and interacted with as a virtual component in a mixed reality system. In some cases, the productivity application software can indicate and/or identify the available components. In some cases, intermediary applications such as a clipboard can be moved from the computing device 210 to the holographic enabled device 200 and shown in the workspace (such as workspace 110). An example of a clipboard implementation is illustrated in and described with respect to FIGS. 3A-3E.

The software component 205, when executed by the holographic-enabled device, provides at least one holographic authoring command corresponding to a semantic representation of an authoring command that can be enacted on at least one content component of the content file. An example and further explanation of the semantic representation of the authoring command is shown in and described with respect to FIGS. 4A-4C.

The software component 205 can recognize sensor data commands (from a user interacting with holographic representations or otherwise providing a command input) and can communicate to the computing device 210 (and productivity application 214) information to affect either the user interface for the productivity application 214 or the content file at the computing device 210. For example, the holographic enabled device can communicate information 230 to the computing device 210 that a command has been performed and/or, when relevant, changes to content of the content file.

The information about the command and/or content can change something in the content file at the computing device 210 and may even change a layout or application configuration. For example, the holographic-enabled device 200 can communicate information 230 to the computing device 210 that a navigation pane is being holographically represented. This information can be used by the productivity application 214 to remove the pane from the user interface.

Conversely, the computing device 210 can communicate information to the holographic-enabled device 200 that aspects of the content file or the productivity application is to be holographically displayed by the holographic-enabled device 200 (for example as the aspect(s) have been changed or removed from the user interface while the user is interacting with the productivity application 214 executing on the computing device 210). The aspects of the content file or the productivity application include, but are not limited to, content components of the content file, command features, and other features of the productivity application or interface (including graphical icons and functionality of the application or interface).

Examples of features that can be modified, for example, via an application programming interface for the productivity application 214 and/or software component 205 include, but are not limited to, content file (modifications to actual content or content components), application configuration, interface configuration, and layout.

As described with respect to FIG. 2A, the two devices communicate directly with each other for a user-perspective seamless operation. However, in some cases, a direct communication between the two devices is not necessary. Indeed, a user may perform holographic augmented authoring separate from an environment with a second computing device in the workspace.

Figure 2B:
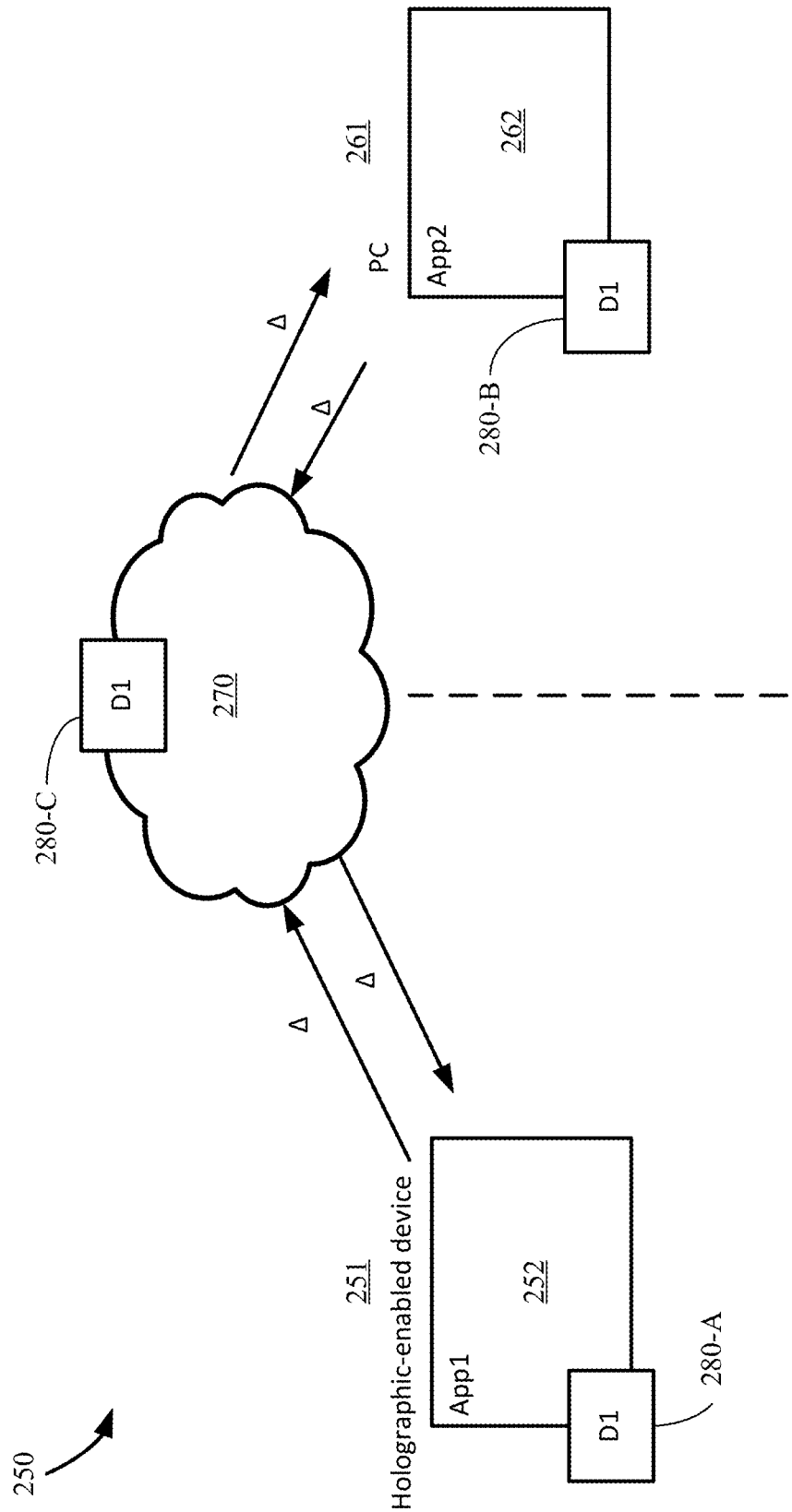
FIG. 2B illustrates another operational environment for an example implementation of holographic augmented authoring.

FIG. 2B illustrates another operational environment for an example implementation of holographic augmented authoring. Referring to FIG. 2B, an operational environment 250 can include a holographic enabled device 251 on which a productivity application 252 (a full, partial, or specialized version) can be executed; a computing device 261 on which another instance of a productivity application 262 can be executed; and a remote or cloud-based service 270.

Figure 6:
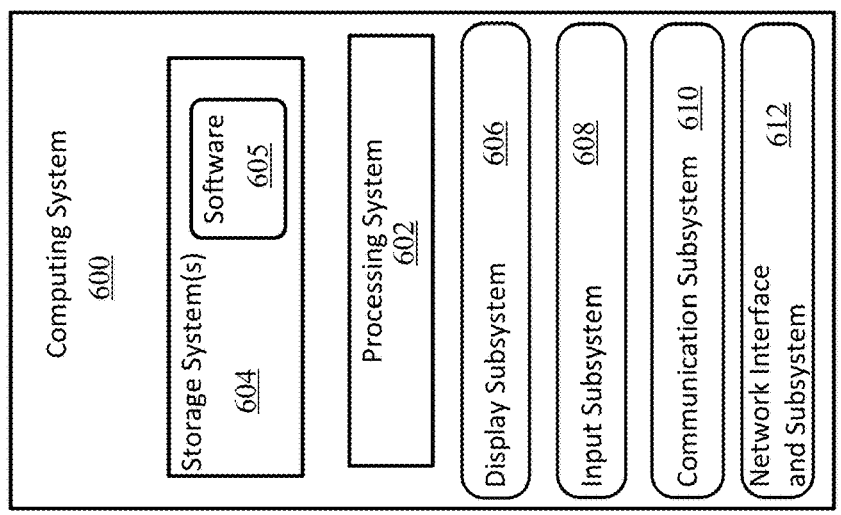
FIG. 6 illustrates an example computing system of a holographic enabled device.
Figure 7:
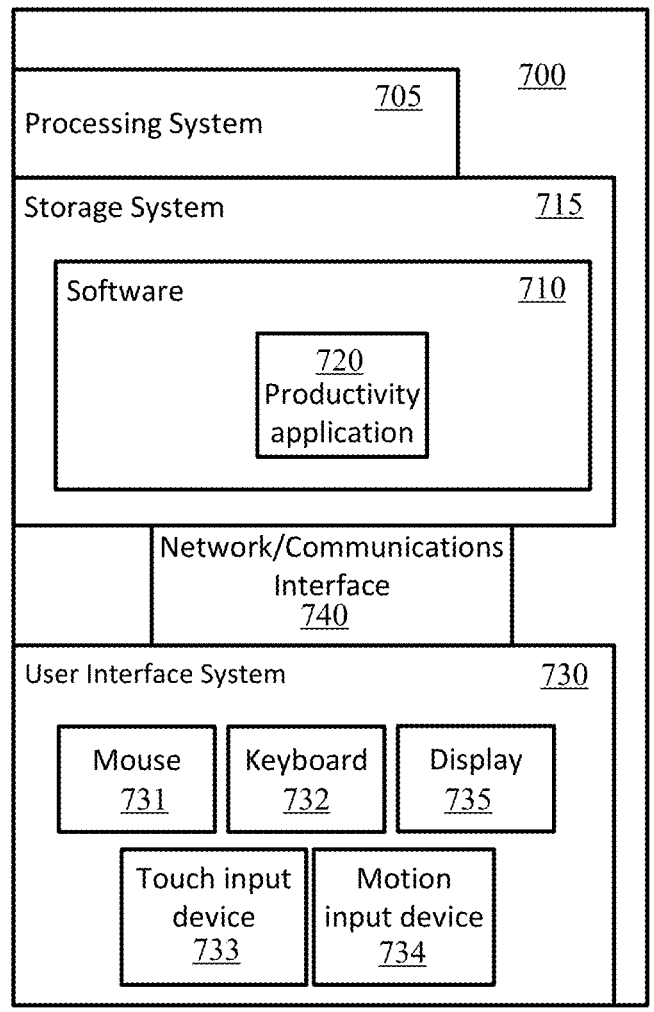
FIG. 7 illustrates components of a computing device that may be used in certain implementations described herein.
Figure 8:
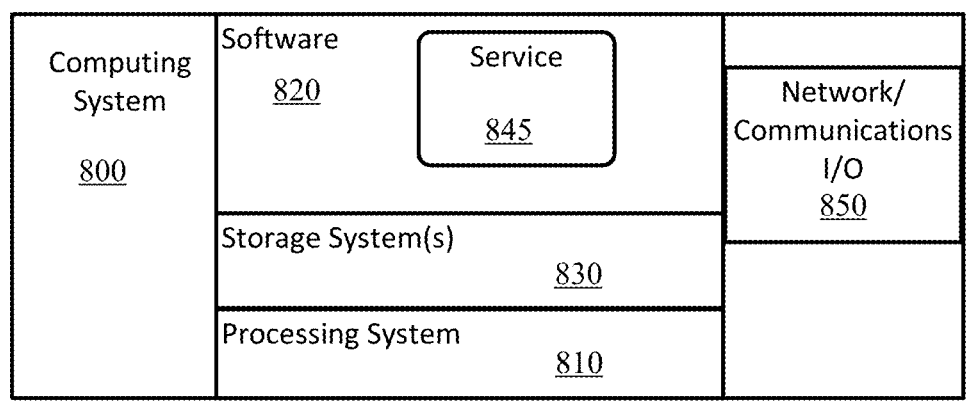
FIG. 8 illustrates components of a computing system that may be used to implement certain methods and services described herein.

Holographic enabled device 251 may be embodied as computing device 600 described with respect to FIG. 6, computing device 261 may be embodied as computing device 700 described with respect to FIG. 7; and service 270 may be embodied as computing system 800 described with respect to FIG. 8.

According to an example scenario that may be carried out in environment 250, collaboration on a content file D1 (or later consumption or editing) can be performed using either or both holographic-enabled devices and other computing devices. A local copy of the content file D1 280-A can be stored at the holographic enabled device 251 and a local copy of the content file D1 280-B can be stored at the computing device 261. In some cases, a master copy of D1 280-C may be stored remotely. For some of the file changes, either or both of the devices 251, 261 can communicate with the service 270 to update the document D1 with and changes. Either deltas or whole documents can be communicated to enable synchronization between documents. A change made to the content file using the holographic enabled device persists so that the content file viewed at another device can contain changes made to the content file when a holographic authoring command is used.

Figure 3A:
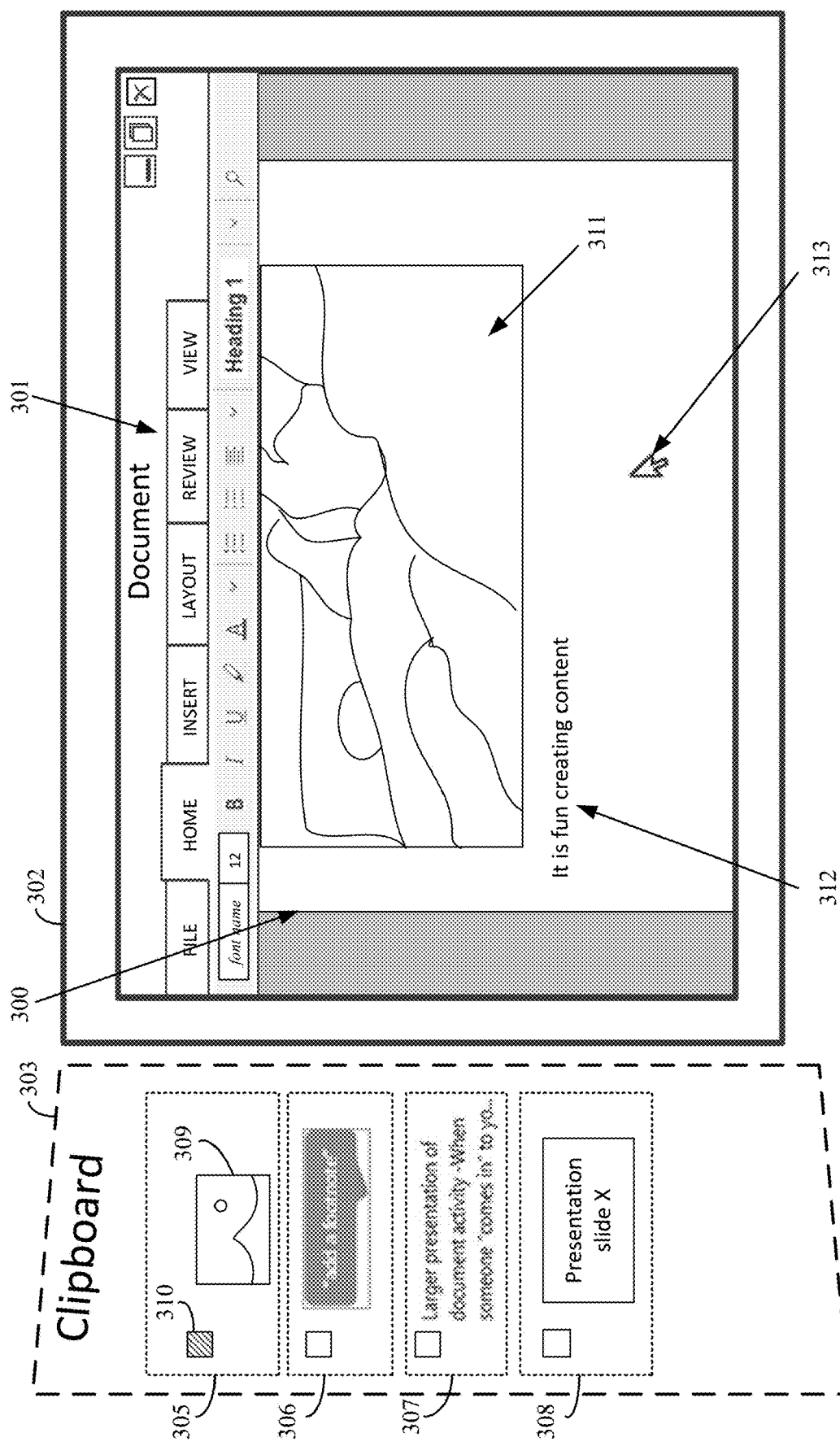
FIGS. 3A-3E illustrate an example of holographic augmented authoring.

FIGS. 3A-3E illustrate an example of holographic augmented authoring. Referring to FIG. 3A, in a holographic mode, a user is working on a document 300 shown in a graphical user interface 301 of a word processing application running on her computing device 302 (configured as device 210 or device 261) and also views, using a holographic enabled device (configured as device 200 or device 251), a clipboard 303 of content the user may have saved from one or more files of one or more file types (e.g., a presentation slide, a clip of text, an image object). The user can see both the graphical user interface 304 displayed at the computing device 302 and the clipboard 303, which is shown floating adjacent the display screen of the computing device 302.

In this example illustration of holographic augmented authoring, the clipboard 303 has four items displayed for inserting/pasting into the document 300. Here, the items include an image 305, a balloon to add a footnote 306, a snippet of text 307, and a presentation slide 308. Each item can be shown with a thumbnail 309 and, in some cases, an icon 310 representing file type. For example, the item of the image 305 can include a thumbnail 309 of the image and an icon 310 indicating the file type as an image. Of course, the actual arrangement, icons, and information conveyed on the clipboard may vary depending on particular implementation and this illustration should not be construed as limiting.

Figure 3B:
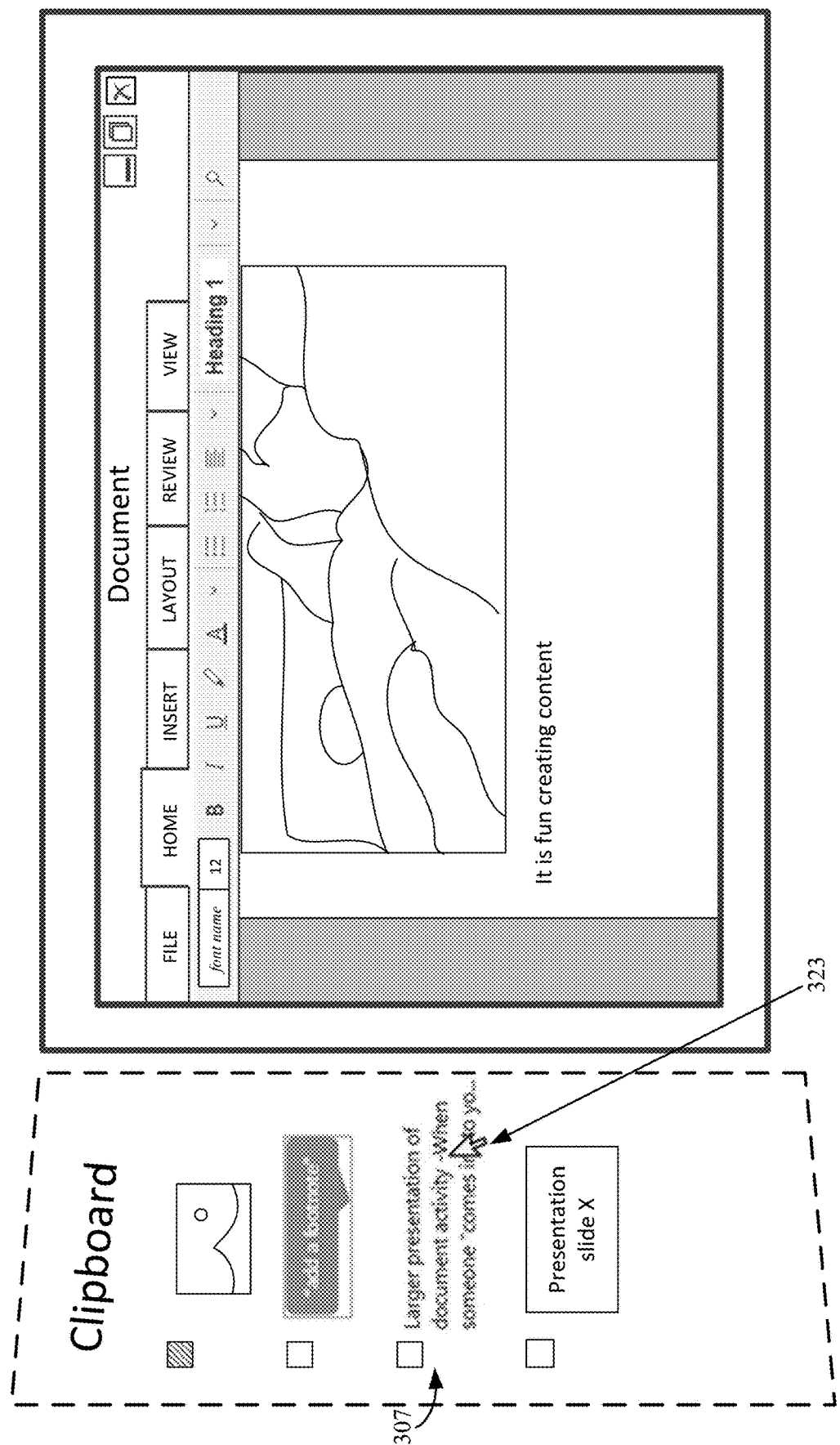

With both the computing device 302 displaying the document 300 and the holographic clipboard 303 in view, the user can perform a variety of content creation tasks involving both the holographic-enabled device and the computing device 302. For example, the user may be adding content to the document 300, which in the state shown in FIG. 3A has an image 311 and some text 312. A mouse icon 313 is shown on the graphical user interface of the computing device 302. In this state, the mouse icon 313 is rendered by the computing device 302. In some cases, in the holographic mode, as the user moves the mouse to the left (e.g., using a mouse input to the computing device 302), the mouse icon 313 is shown moving across the display of the computing device 302 and, when the mouse gets to the position where the mouse icon 313 would disappear off the screen to the left (or at some other designated position), the computing device 302 can communicate to the holographic-enabled device to begin displaying the mouse icon holographically such as shown in FIG. 3B.

Figure 3C:
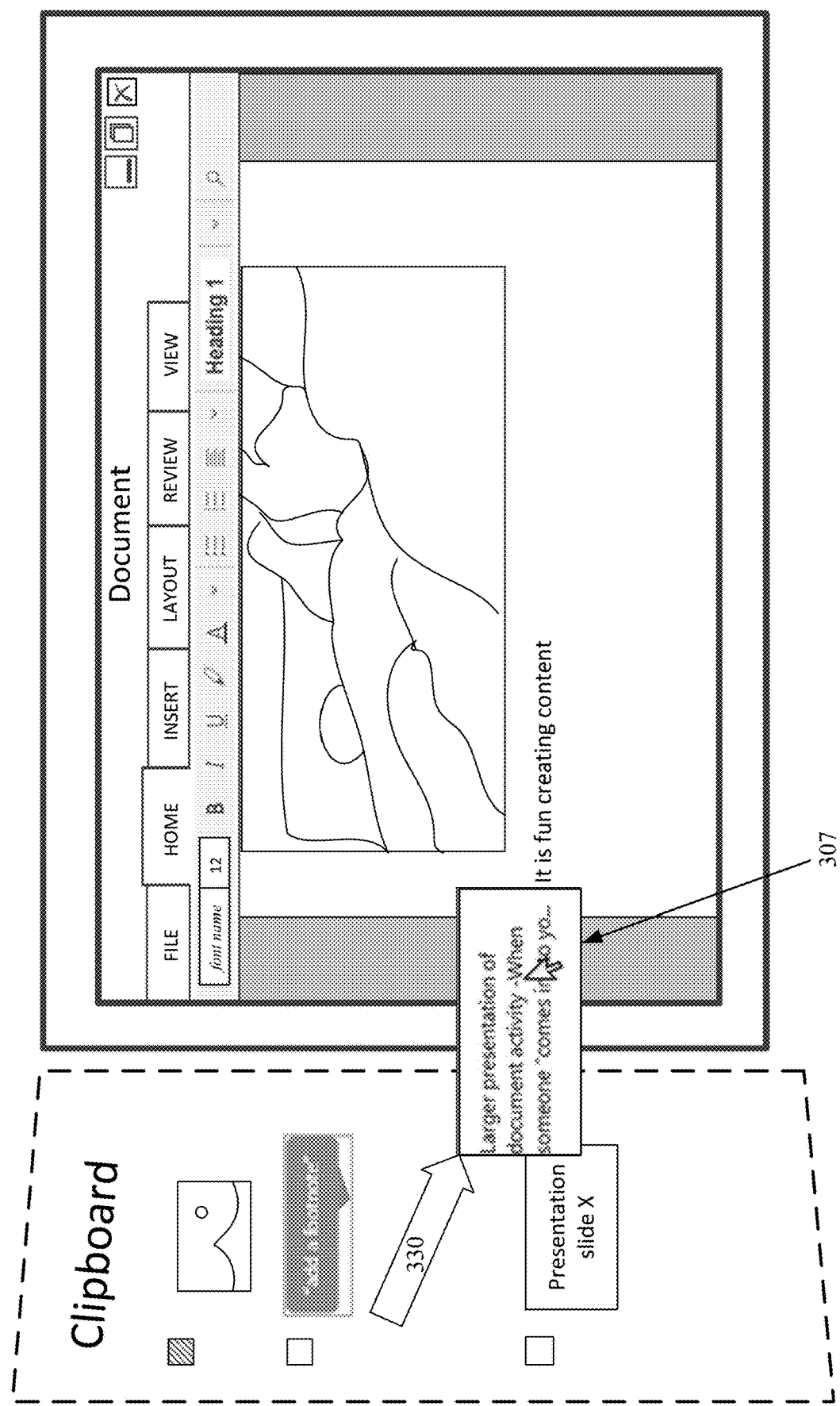
Figure 3D:
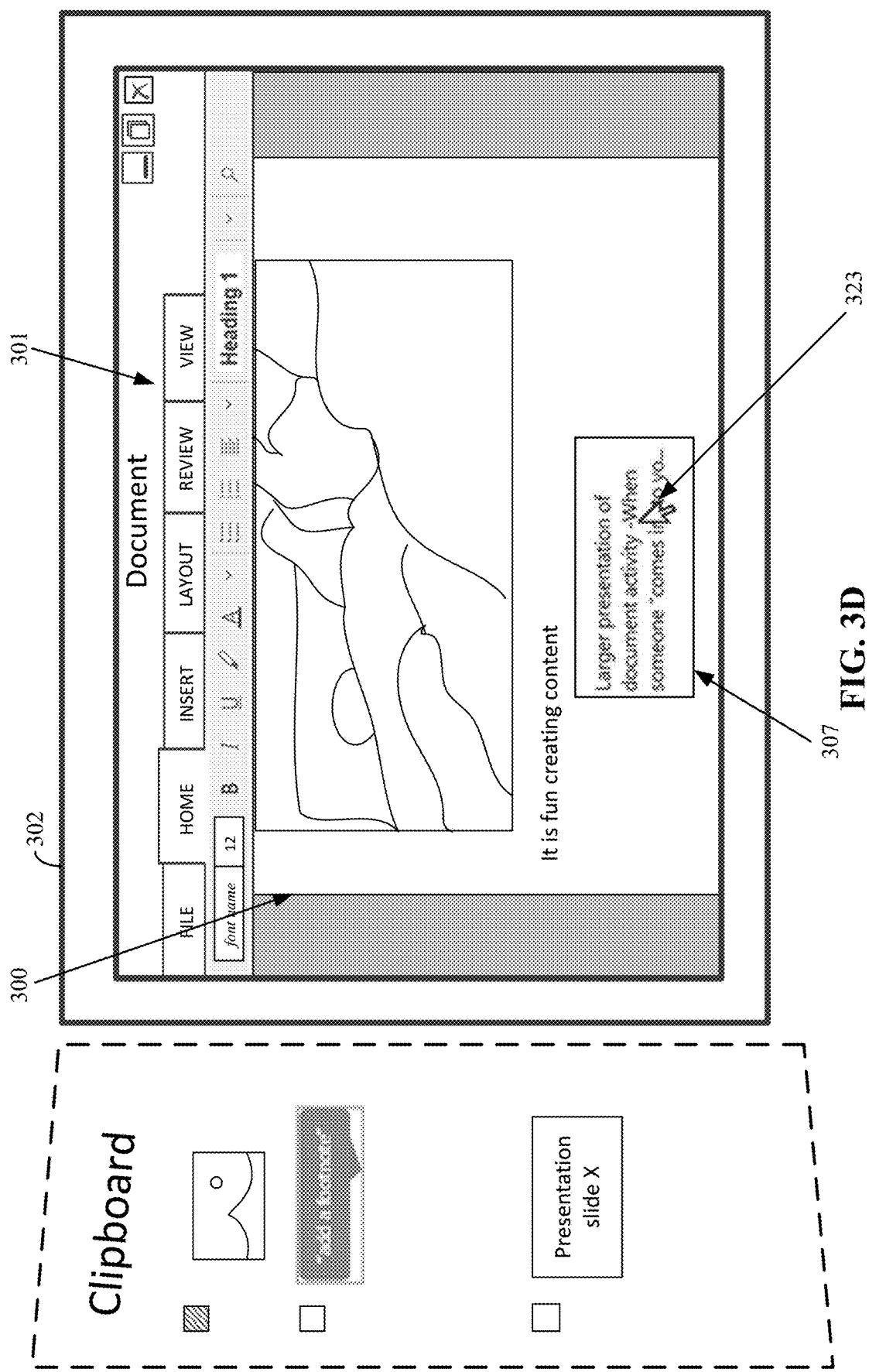
Figure 3E:
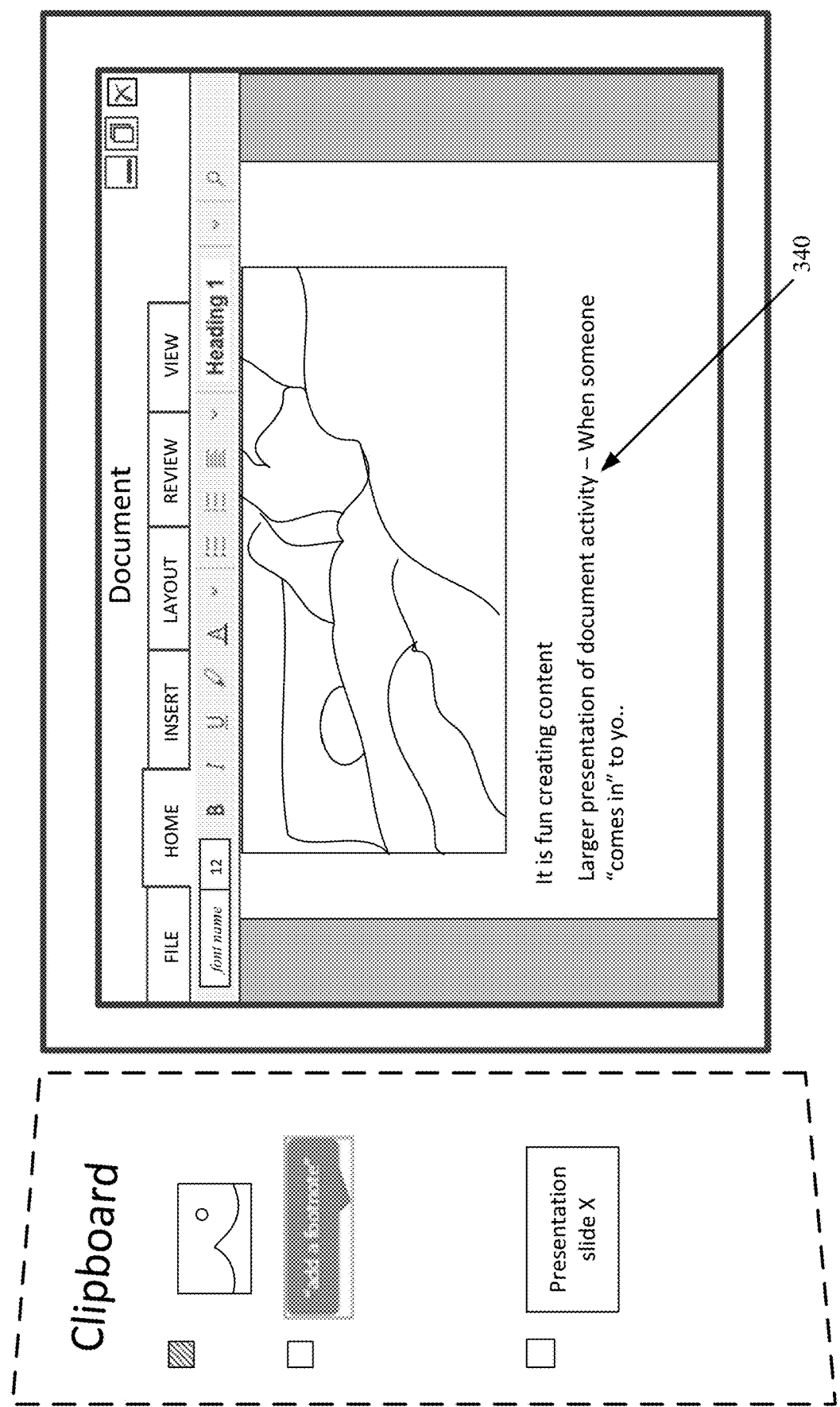

The holographic-enabled device can present a holographic mouse icon 323, which may be controlled by any of a variety of input devices to the holographic-enabled device. In the example illustration, the user may have decided to use the clipboard 303 to insert some previously saved or clipped content into the document 300. The user may, for example provide verbal and/or eye gaze input to the holographic-enabled device to select the snippet of text 307 from the clipboard 303 and then, as shown in FIGS. 3B and 3C move (330) the selection (snippet of text 307 and optionally the holographic mouse icon 323) to a position on the document 300 in front of the graphical user interface 301 of the computing device 302. The holographic-enabled device can then communicate, upon appropriate command from the user, to insert the snippet of text 307 so that the computing device renders the appropriate content 340 as shown in FIG. 3E. This and other seamless-to-the-user manipulations and interactions can take place through direct and indirect communication between the holographic-enabled device (e.g., 200, 251) and the computing device (e.g., 210, 261).

A method performed by a holographic-enabled device 200, 251 can include providing a set of holographic authoring commands. The holographic authoring commands refer to special commands that result in features corresponding to a semantic representation of an authoring command that can be enacted on at least one content component of a content file. The holographic authoring commands are not merely the actions conventionally available from the various menus found in a productivity application. Although these commands may be present (either as part of a visualization of a menu or simply understood by the instance of the productivity application 252 at the holographic enabled device 251 or by component 205 of device 200), the holographic authoring commands are an additional or augmented set of commands that take advantage of holographic capabilities of a holographic enabled device.

In response to the holographic enabled device 200, 251 receiving an indication to execute a selected holographic authoring command from the set of holographic authoring commands, the holographic enabled device 200, 251 can perform the selected holographic authoring command to modify the content file. The modification to the content file can be performed on a specific content component and saved at the holographic-enabled device, for example as local copy 280-A. The modified content file or an indication of what is changed (e.g., the delta) can be uploaded to synchronize with a persisted content file (e.g., 280-C) at a remote storage location.

Figure 4A:
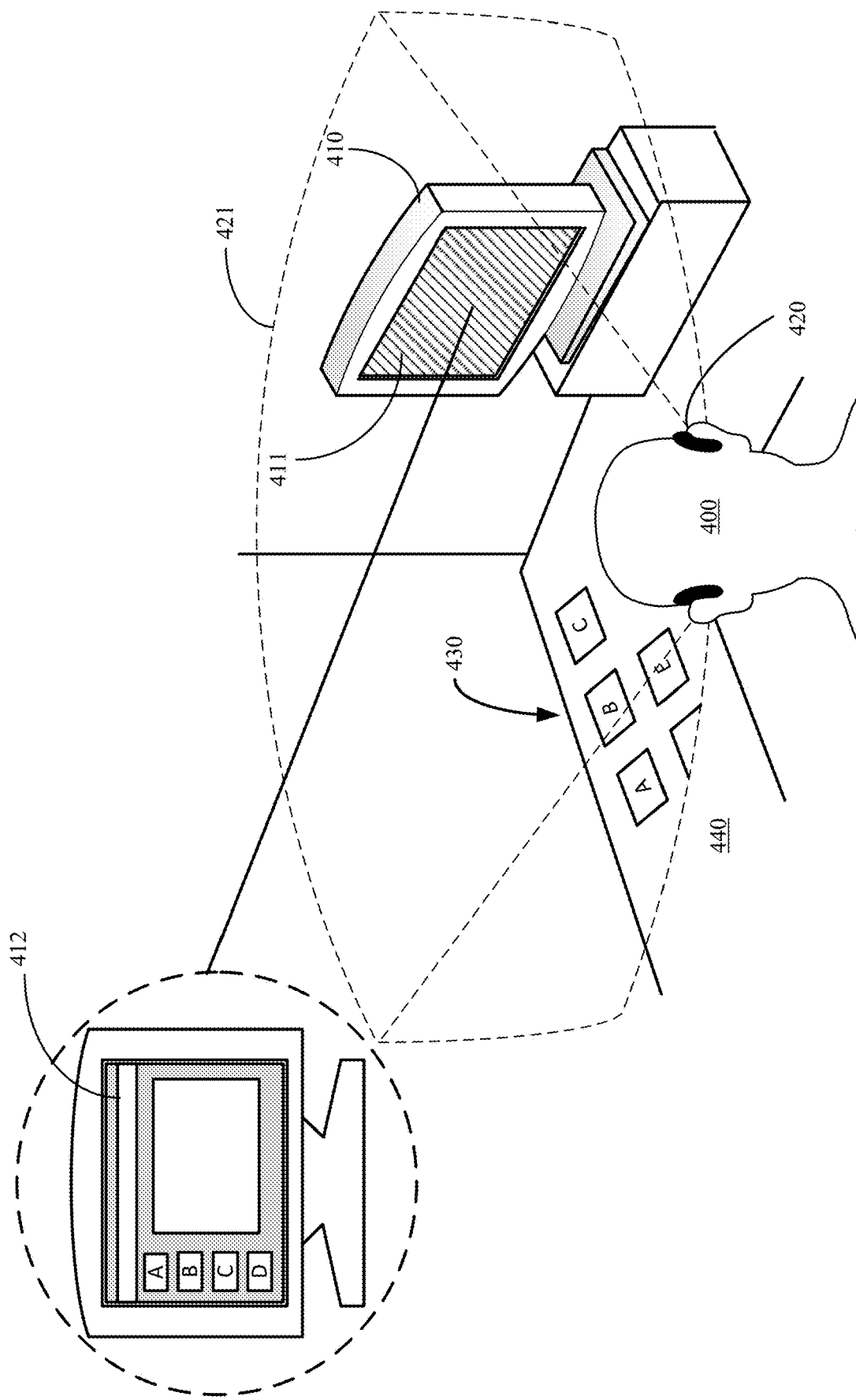
FIGS. 4A-4C illustrate an example of holographic augmented authoring.
Figure 4B:
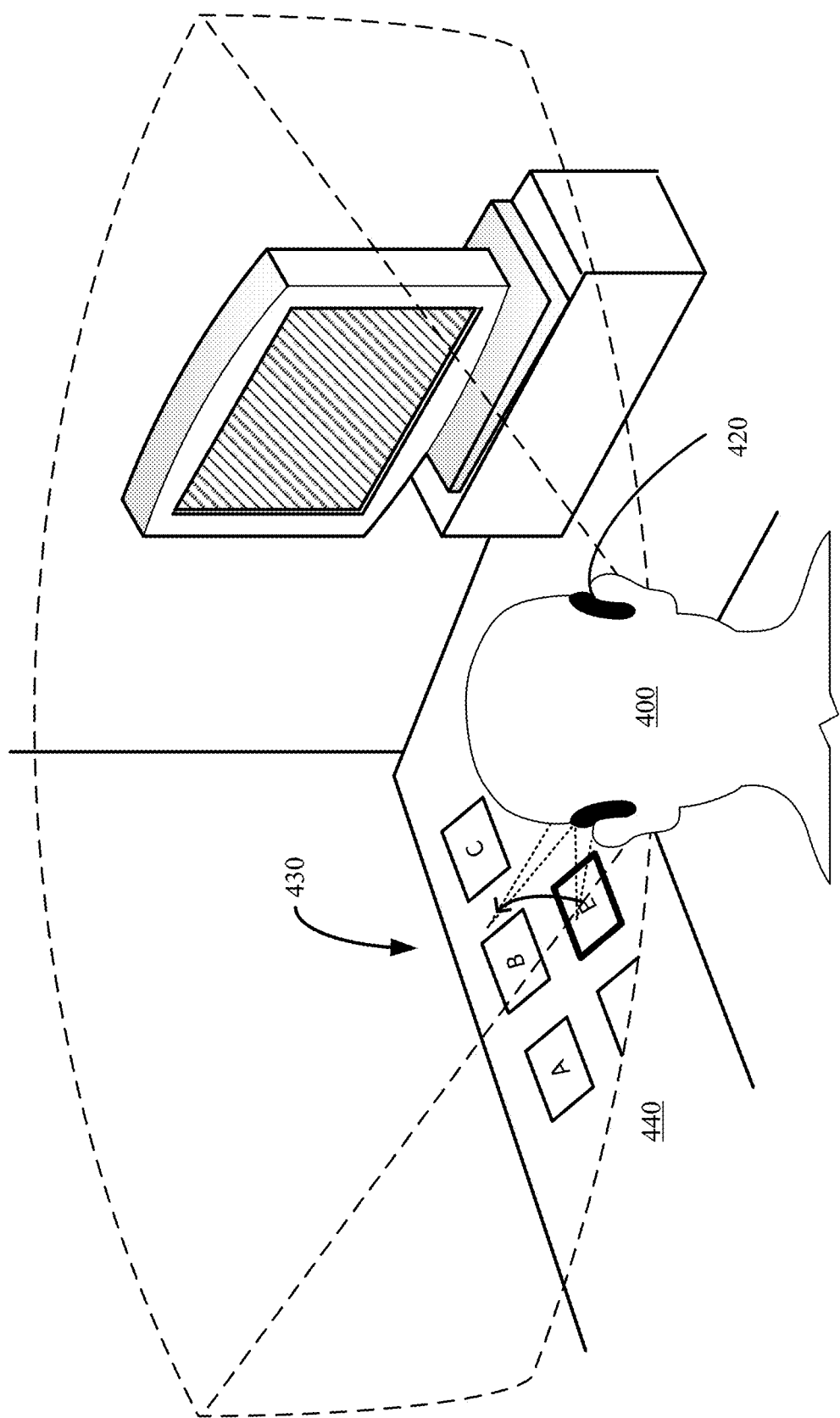
Figure 4C:
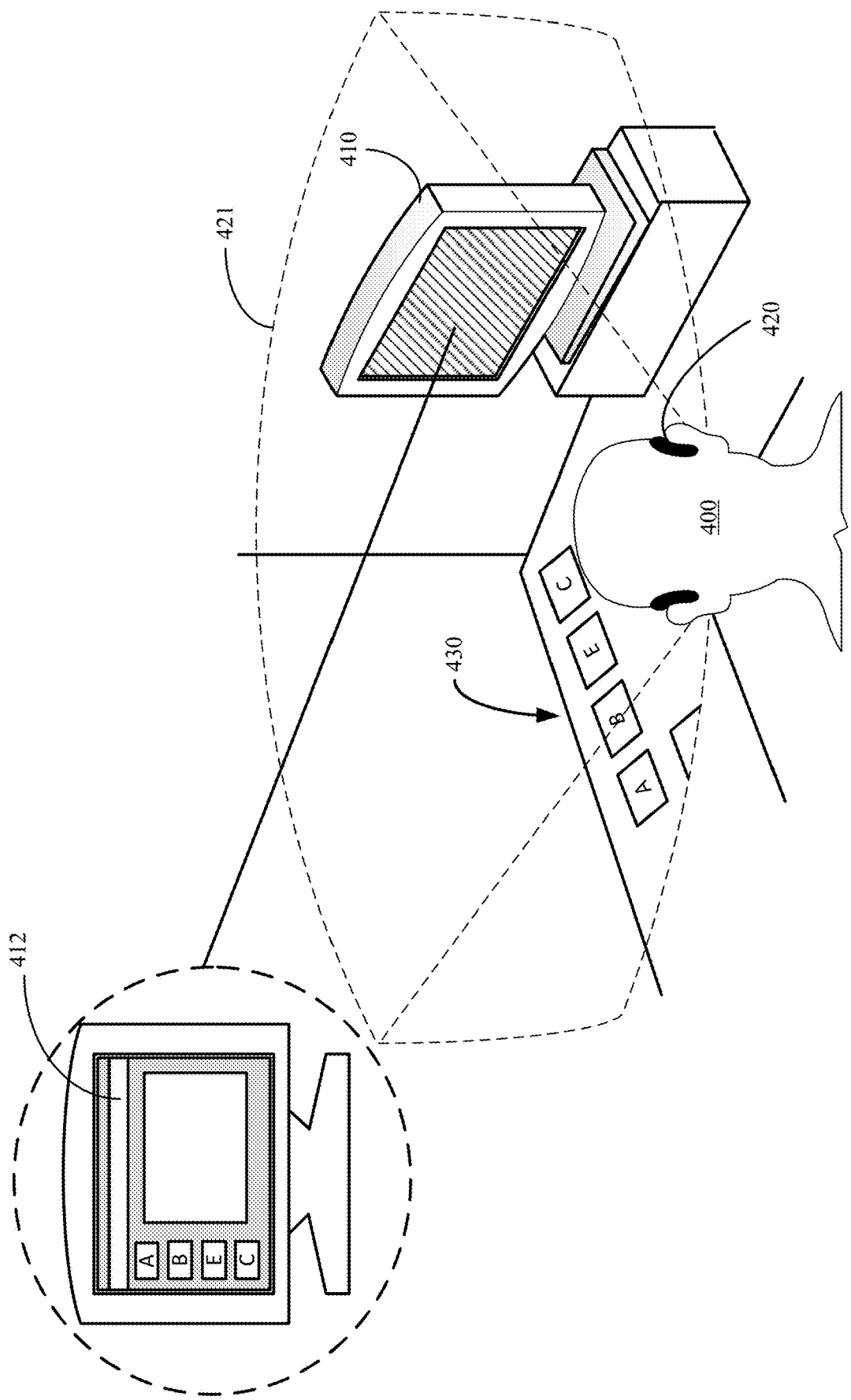

An example of a holographic authoring command 'slide sort' is shown in FIGS. 4A-4C.

FIGS. 4A-4C illustrate an example of holographic augmented authoring. Referring to FIG. 4A, a user 400 working on a presentation using a presentation application running on her computing device 410 can holographically augment her authoring experience by using a HMD device 420 implementing a holographic enabled device. In her field of view 421, she can have her computing device 410, which may display, on its monitor 411, a graphical user interface 412 for the presentation application. In addition, as a result of one or more holographic authoring commands, which may be part of or prior to a command for slide sort, the slides A, B, C, D, E of her presentation can be represented as holographic slides, individually movable at least within an action region 430 defined for the slide sort. The action region refers to a physical region in which the action corresponding to a particular command is expected to be carried out. Here, the action region 430 is shown anchored to a desk 440.

In one implementation, user 400 requests holographic slide sort via the holographic enabled device 420, which then communicates with the computing device 410 to obtain the content components for the slides, transforms the content components into holographic representations, and assigns or lets the user anchor to a particular area in the environment. In another implementation, user 400 requests holographic slide sort via the user interface 412 at the computing device 410 at which time the productivity application communicates to the HMD device 420 the content components and that a slide sort command is requested.

Referring to FIG. 4B, while in the slide sort holographic authoring command function, the user 400 is shown, using eye gaze, to move slide E to between B and C within action region 430.

Then, as shown in FIG. 4C, the new arrangement can be communicated to the productivity application running on the computing device 410 (and saved in the content file at the computing device). As can be seen, as a result of the save, the order arrangement (A, B, C, D) of the slides are shown in the normal view of the graphical user interface 412.

Accordingly, when a selected holographic authoring command comprises a slide sort function and the content file comprises a presentation file of a presentation application having content components including at least slides, the semantic representation of the slide sort function comprises holographic images of each slide on a real surface in a surrounding environment of a user of the holographic-enabled device, the holographic images are rearrangeable on the real surface, and a change in an arrangement of the holographic images corresponds to a modification to the order of the slides in the content file.

Although eye gaze is specifically illustrated, voice or hand tracking may be used to provide the interaction.

In some cases, the semantic meaning can be what gets encoded in file format.

Although presentation applications are discussed in detail herein, it should be understood that other productivity applications can include holographic augmented authoring. For example, spreadsheet applications, word processing applications, notebook applications, and the like may have software components for execution on a holographic enabled device and include application programming interfaces for communication therebetween. Therefore, in addition to slides, other content components that may be separated from a content file and acted upon in the holographic mode include, but are not limited to, worksheet tabs, pivot table, charts (named objects floating around) or pages, images, and clippings.

For the described holographic augmented authoring, interaction takes place in holographic arena, but the results of the interaction can be captured in existing format without requiring collaborators or consumers to use holographic-enabled devices.

A component object from a productivity application (could be menu, content) can be transformed by the holographic enabled device to generate mini interaction surfaces that can then be moved around and anchored to physical objects in an environment. Changes to content within these and between these component objects can be written back into a content file that is understood by a non-holographic enabled device.

Holographic augmented authoring provides a richer authoring experience. Once changes are made using holographic augmented authoring, the changes can be expressed and interpreted appropriately in the desktop experience. In this manner, a holographic enabled device such as a HMD device does not need to be worn all day. Changes can be made to a content file using the holographic augmented features and the gains made by this functionality with respect to speed, ease of use, and/or reduced use of paper products do not result in a requirement to have holographic enabled devices in order to see the content authored during the session with the HMD device.

In the mixed reality system provided by the holographic enabled device, certain actions taken by the user can be mapped to specialized commands. For example, a user can verbally, gesturally, or via eye gaze, take a representation of a slide or document, and drop the representation in (or near) a physical filing cabinet, where this activity can be mapped to actually moving the document, component of the document, or copy thereof to a particular file location on a particular device (or cloud storage). As another example, an action appearing to drag a representation of a document to person in the room can be mapped to a command for messaging a copy of the document to a particular person.

Figure 5:
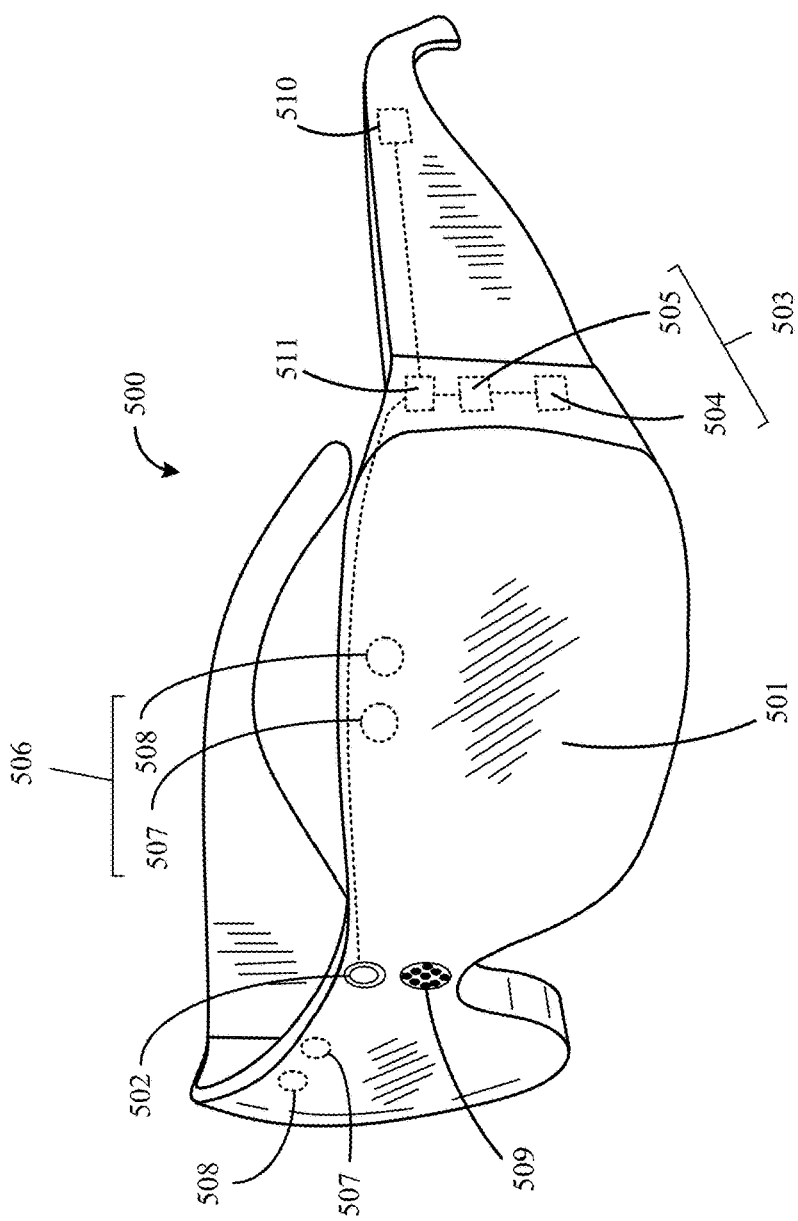
FIG. 5 illustrates an example head-mounted display-based holographic enabled device that may be used in certain implementations described herein.

A holographic enabled device may be implemented as a see-through, mixed reality display device. FIG. 5 illustrates an example head-mounted display-based holographic enabled device that may be used in certain implementations described herein; and FIG. 6 illustrates an example computing system that can implement a holographic enabled device.

As shown in FIG. 5, the example head-mounted display-based holographic enabled device can take the form of an HMD device 500. The illustrated HMD device 500 implements computing system 600 in the form of wearable glasses or goggles, but it will be appreciated that other forms are possible. The HMD device 500 includes a see-through display subsystem 606 (e.g., an at least partially see-through stereoscopic display) with one or more lenses 501 that may be configured to visually augment an appearance of a physical environment being viewed by the user through the see-through display subsystem such that images may be displayed using lenses 501 (e.g. using projection onto lenses 501, one or more waveguide systems incorporated into the lenses 501, and/or in any other suitable manner).

In some examples, the see-through display subsystem may include one or more regions that are transparent (e.g., optically clear) and may include one or more regions that are opaque or semi-transparent. In other examples, the see-through display subsystem may be transparent (e.g., optically clear) across an entire usable display surface of the see-through display subsystem.

The HMD device 500 includes an optical sensor system 502 that may include one or more optical sensors. In one example, the optical sensor system 502 can include one or more outward facing optical sensors that may be configured to acquire and detect the real-world background and/or physical space from a similar vantage point (e.g., line of sight) as observed by the user through the lenses 501. The optical sensor system 502 may include a variety of sensors, such as one or both of a depth camera/sensor and an RGB camera/sensor. In some cases, a high definition camera or other resolutions for image sensing may be used.

The sensors included with the HMD device 500 can support various functionalities including head tracking to determine the 3D (three-dimensional) position and orientation of the user's head within the physical real world space; and gaze tracking to ascertain a direction of the user's gaze.

For example, the HMD device 500 can include a position sensor system 503 that may include one or more position sensors 504 such as accelerometer(s), gyroscope(s), magnetometer(s), global positioning system(s) (GPS) 505, multi-lateration tracker(s) (not shown), and/or other sensors that output position sensor information useable as a position, orientation, and/or movement of the relevant sensor.

When position sensor system 503 includes one or more motion sensors 504 (e.g., inertial, multi-axis gyroscopic or acceleration sensors), movement and position/orientation/pose of a user's head may be detected when the user is wearing the system.

The HMD device 500 may further include a gaze detection subsystem 506 configured for detecting a direction of gaze of each eye of a user or a direction or location of focus. Gaze detection subsystem 506 may be configured to determine gaze directions of each of a user's eyes in any suitable manner. For example, in the illustrative example shown, a gaze detection subsystem 506 includes one or more glint sources 507, such as infrared light sources, that are configured to cause a glint of light to reflect from each eyeball of a user, and one or more image sensors 508, such as inward-facing sensors, that are configured to capture an image of each eyeball of the user. Changes in the glints from the user's eyeballs and/or a location of a user's pupil, as determined from image data gathered using the image sensor(s) 508, may be used to determine a direction of gaze.

In addition, a location at which gaze lines projected from the user's eyes intersect the external display may be used to determine an object at which the user is gazing (e.g. a displayed virtual object and/or real background object). Gaze detection subsystem 506 may have any suitable number and arrangement of light sources and image sensors. In some implementations, the gaze detection subsystem 506 may be omitted.

The HMD device 500 may include one or more microphones 509 configured to detect sounds, such as voice commands from a user.

Position sensor system 503 (including motion sensors 504), as well as microphone(s) 509 and gaze detection subsystem 506, also may be employed as user input devices, such that a user may interact with the HMD device 500 via gestures of the eye, neck and/or head, as well as via verbal commands in some cases. These systems are represented as input subsystem 608 in FIG. 6.

The HMD device 500 can be configured with one or more audio transducers 510 (e.g., speakers, earphones, etc.) so that audio can be utilized as part of the user experience.

The HMD device 500 can further include a controller 511, which includes components described with respect to computing system 600, such as processing system 602 and storage system 604. Controller 511 can be in communication with the sensors 502, gaze detection subsystem 506, lenses 501, and/or other components through, for example, a communications subsystem 610. The communications subsystem 610 can operate with a network interface and subsystem 612 to facilitate the display system being operated in conjunction with remotely located resources, such as processing, storage, power, data, and services. That is, in some implementations, an HMD device can be operated as part of a system that can distribute resources and capabilities among different components and subsystems.

The storage system 604 may include instructions stored thereon that are executable by processing system 602, for example, to receive and interpret inputs from the sensors, to identify location and movements of a user, to identify real objects using surface reconstruction and other techniques, and dim/fade the display based on distance to objects so as to enable the objects to be seen by the user, among other tasks.

The HMD device 500 may include instructions stored on the storage system 604 for image production that direct the HMD device 500 to display virtual objects to the user, which are visually superimposed onto the physical environment so as to be perceived at various depths and locations. The HMD device 500 may use stereoscopy to visually place a virtual object at a desired depth by displaying separate images of the virtual object to both of the user's eyes. To achieve the perception of depth, the instructions for image product may render the two images of the virtual object at a rendering focal plane of the HMD device 500, such that there is a binocular disparity between the relative positions of the virtual object in the two images. For example, this binocular disparity may be a horizontal disparity where the relative positions of the virtual object in the two images is separated by a distance in the x axis direction. Here, the x axis may be defined as the axis extending to the left and the right relative to the user, the y axis extending upward and downward relative to the user, and the z axis extending forward and backward relative to the user.

The horizontal disparity between the relative positions of the virtual object in the two images will cause the user to perceive that the virtual object is located at a certain depth within the viewed physical environment due to stereopsis. Using this stereoscopy technique, the HMD device 500 may control the displayed images of the virtual objects, such that the user will perceive that the virtual objects exist at a desired depth and location in the viewed physical environment.

Optical sensor information received from the optical sensor system 502 and/or position sensor information received from position sensor system 503 may be used to assess a position and orientation of the vantage point of the at least partially see-through stereoscopic display relative to other environmental objects. In some embodiments, the position and orientation of the vantage point may be characterized with six degrees of freedom (e.g., world-space X, Y, Z, pitch, roll, and yaw). The vantage point may be characterized globally or independent of the real-world background. The position and/or orientation may be determined with an on-board computing system (e.g., controller 511) and/or an off-board computing system.

Furthermore, the optical sensor information and the position sensor information may be used by a computing system to perform analysis of the real-world background, such as depth analysis, surface reconstruction, environmental color and lighting analysis, or other suitable operations. In particular, the optical and positional sensor information may be used to create a virtual model of the real-world background. In some embodiments, the position and orientation of the vantage point may be characterized relative to this virtual space. Moreover, the virtual model may be used to determine positions of virtual objects in the virtual space and add additional virtual objects to be displayed to the user at a desired depth and location within the virtual world.

When the position sensor system 503 includes GPS 505, the system can use the GPS 505 to determine a location of the HMD device 500. This may help to identify real world objects, such as buildings, etc. that may be located in the user's adjoining physical environment.

A power management subsystem (not shown) may include one or more batteries and/or protection circuit modules (PCMs) and an associated charger interface and/or remote power interface for supplying power to components in the HMD device 500.

It may be understood that sensors illustrated in, and described with respect to, FIG. 5 are included for the purpose of example and are not intended to be limiting in any manner, as any other suitable sensors and/or combination of sensors may be utilized to meet the needs of a particular implementation of a head-mounted holographic enabled device. For example, biometric sensors (e.g., for detecting heart and respiration rates, blood pressure, brain activity, body temperature, etc.) or environmental sensors (e.g., for detecting temperature, humidity, elevation, UV (ultraviolet) light levels, etc.) may be utilized in some implementations.

It is to be understood that the display device may include additional and/or alternative sensors, cameras, microphones, input devices, output devices, etc. than those shown without departing from the scope of the present arrangement. Additionally, the physical configuration of a display device and its various sensors and subcomponents may take a variety of different forms without departing from the scope of the present arrangement.

As mentioned above, computing system 600 can implement a holographic enabled device, including, but not limited to HMD device 500. Computing system 600 includes a processing system 602, which can include a logic processor (and may even include multiple processors of same or different types), and a storage system 604, which can include volatile and non-volatile memory.

Processing system 602 may include one or more physical processors (hardware) configured to execute software instructions. Additionally or alternatively, the logic processor may include one or more hardware logic circuits or firmware devices configured to execute hardware-implemented logic or firmware instructions. Processors of the processing system 602 may be single-core or multi-core, and the instructions executed thereon may be configured for sequential, parallel, and/or distributed processing. Individual components of the processing system 602 optionally may be distributed among two or more separate devices, which may be remotely located and/or configured for coordinated processing. Aspects of the processing system 602 may be virtualized and executed by remotely accessible, networked computing devices configured in a cloud-computing configuration. In such a case, these virtualized aspects are run on different physical logic processors of various different machines, it will be understood.

Processing system 602 includes one or more physical devices configured to execute instructions. The processing system 602 may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result. When the instructions are software based (as opposed to hardware-based such as implemented in a field programmable gate array (FPGA) or digital logic), the instructions can be stored as software 605 in the storage system 604.

Storage system 604 may include physical devices that are removable and/or built-in. Storage system 604 can include one or more volatile and non-volatile storage devices such as optical memory (e.g., CD, DVD, HD-DVD, Blu-Ray Disc, etc.), semiconductor memory (e.g., RAM, SRAM, DRAM, ROM, EPROM, EEPROM, FLASH memory, etc.), and/or magnetic memory (e.g., hard-disk drive, floppy-disk drive, tape drive, MRAM, etc.), or other mass storage device technology. Storage system 604 may include dynamic, static, read/write, read-only, random-access, sequential-access, location-addressable, file-addressable, and/or content-addressable devices. It should be understood that a storage device or a storage medium of the storage system includes one or more physical devices and excludes propagating signals per se. It can be appreciated that aspects of the aspects of the instructions described herein may be propagated by a pure signal (e.g., an electromagnetic signal, an optical signal, etc.) using a communications medium, as opposed to being stored on a storage device or medium. Furthermore, data and/or other forms of information pertaining to the present arrangement may be propagated by a pure signal.

Aspects of processing system 602 and storage system 604 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 600 implemented to perform a particular function. In some cases, a module, program, or engine may be instantiated via processing system 602 executing instructions held by a non-volatile storage of storage system 604, using portions of a volatile storage of storage system 604. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 606 may be used to present a visual representation of data held by storage system 604. This visual representation may take the form of a graphical user interface (GUI). As the herein described methods and processes change the data held by the storage system, and thus transform the state of the storage system, the state of display subsystem 606 may likewise be transformed to visually represent changes in the underlying data. Display subsystem 606 may include one or more display devices utilizing virtually any type of technology. Such display devices may be combined with processing system 602 and/or storage system 604 in a shared enclosure, or such display devices may be peripheral display devices. The at least partially see-through display of HMD 500 described above is one example of a display subsystem 606.

When included, input subsystem 608 may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; any of the sensors described above with respect to FIG. 5 and/or any other suitable sensor.

When included, network interface and subsystem 612 may be configured to communicatively couple computing system 600 with one or more other computing devices. Network interface and subsystem 612 may include wired and/or wireless communication devices compatible with one or more different communication protocols. As non-limiting examples, the network interface and subsystem 612 may be configured for communication via a wireless telephone network, or a wired or wireless, near-field, local- or wide-area network. In some embodiments, the network interface and subsystem 612 may allow computing system 600 to send and/or receive messages to and/or from other devices via a network such as the Internet.

FIG. 7 illustrates components of a computing device that may be used in certain implementations described herein; and FIG. 8 illustrates components of a computing system that may be used to implement certain methods and services described herein.

Referring to FIG. 7, system 700 may represent a computing device such as, but not limited to, a personal computer, a reader, a mobile device, a personal digital assistant, a wearable computer, a smart phone, a tablet, a laptop computer (notebook or netbook), a gaming device or console, an entertainment device, a hybrid computer, a desktop computer, or a smart television. Accordingly, more or fewer elements described with respect to system 700 may be incorporated to implement a particular computing device.

System 700 includes a processing system 705 of one or more processors to transform or manipulate data according to the instructions of software 710 stored on a storage system 715. Examples of processors of the processing system 705 include general purpose central processing units, application specific processors, and logic devices, as well as any other type of processing device, combinations, or variations thereof. The processing system 705 may be, or is included in, a system-on-chip (SoC) along with one or more other components such as network connectivity components, sensors, video display components.

The software 710 can include an operating system and application programs such as a productivity application 720 that may include components for communicating with a holographic enabled device such as described herein. Device operating systems generally control and coordinate the functions of the various components in the computing device, providing an easier way for applications to connect with lower level interfaces like the networking interface. Non-limiting examples of operating systems include Windows® from Microsoft Corp., Apple® iOS™ from Apple, Inc., Android® OS from Google, Inc., and the Ubuntu variety of the Linux OS from Canonical.

It should be noted that the operating system may be implemented both natively on the computing device and on software virtualization layers running atop the native device operating system (OS). Virtualized OS layers, while not depicted in FIG. 7, can be thought of as additional, nested groupings within the operating system space, each containing an OS, application programs, and APIs.

Storage system 715 may comprise any computer readable storage media readable by the processing system 705 and capable of storing software 710 including the productivity application 720.

Storage system 715 may include volatile and nonvolatile, removable and non-removable media implemented in any method or technology for storage of information, such as computer readable instructions, data structures, program modules, or other data. Examples of storage media of storage system 715 include random access memory, read only memory, magnetic disks, optical disks, CDs, DVDs, flash memory, magnetic cassettes, magnetic tape, magnetic disk storage or other magnetic storage devices, or any other suitable storage media. In no case is the storage medium a propagated signal or carrier wave.

Storage system 715 may be implemented as a single storage device but may also be implemented across multiple storage devices or sub-systems co-located or distributed relative to each other. Storage system 715 may include additional elements, such as a controller, capable of communicating with processing system 705.

Software 710 may be implemented in program instructions and among other functions may, when executed by system 700 in general or processing system 705 in particular, direct system 700 or the one or more processors of processing system 705 to operate as described herein.

In general, software may, when loaded into processing system 705 and executed, transform computing system 700 overall from a general-purpose computing system into a special-purpose computing system customized to retrieve and process the information for facilitating content authoring as described herein for each implementation. Indeed, encoding software on storage system 715 may transform the physical structure of storage system 715. The specific transformation of the physical structure may depend on various factors in different implementations of this description. Examples of such factors may include, but are not limited to the technology used to implement the storage media of storage system 715 and whether the computer-storage media are characterized as primary or secondary storage.

The system can further include user interface system 730, which may include input/output (I/O) devices and components that enable communication between a user and the system 700. User interface system 730 can include input devices such as a mouse 731, track pad (not shown), keyboard 732, a touch device 733 for receiving a touch gesture from a user, a motion input device 734 for detecting non-touch gestures and other motions by a user, a microphone for detecting speech (not shown), and other types of input devices and their associated processing elements capable of receiving user input.

The user interface system 730 may also include output devices such as display screen(s) 735, speakers (not shown), haptic devices for tactile feedback (not shown), and other types of output devices. In certain cases, the input and output devices may be combined in a single device, such as a touchscreen display which both depicts images and receives touch gesture input from the user. A touchscreen (which may be associated with or form part of the display) is an input device configured to detect the presence and location of a touch. The touchscreen may be a resistive touchscreen, a capacitive touchscreen, a surface acoustic wave touchscreen, an infrared touchscreen, an optical imaging touchscreen, a dispersive signal touchscreen, an acoustic pulse recognition touchscreen, or may utilize any other touchscreen technology. In some embodiments, the touchscreen is incorporated on top of a display as a transparent layer to enable a user to use one or more touches to interact with objects or other information presented on the display.

Visual output may be depicted on the display 735 in myriad ways, presenting graphical user interface elements, text, images, video, notifications, virtual buttons, virtual keyboards, or any other type of information capable of being depicted in visual form.

The user interface system 730 may also include user interface software and associated software (e.g., for graphics chips and input devices) executed by the OS in support of the various user input and output devices. The associated software assists the OS in communicating user interface hardware events to application programs using defined mechanisms. The user interface system 730 including user interface software may support a graphical user interface, a natural user interface, or any other type of user interface. For example, the interfaces for the productivity application and/or the productivity tool for assisted content authoring (and corresponding functionality) described herein may be presented through user interface system 730.

Communications interface 740 may include communications connections and devices that allow for communication with other computing systems over one or more communication networks (not shown). Examples of connections and devices that together allow for inter-system communication may include network interface cards, antennas, power amplifiers, RF circuitry, transceivers, and other communication circuitry. The connections and devices may communicate over communication media (such as metal, glass, air, or any other suitable communication media) to exchange communications with other computing systems or networks of systems. Transmissions to and from the communications interface are controlled by the OS, which informs applications of communications events when necessary.

Computing system 700 is generally intended to represent a computing system with which software is deployed and executed in order to implement an application, component, or service for a productivity tool as described herein. In some cases, aspects of computing system 700 may also represent a computing system on which software may be staged and from where software may be distributed, transported, downloaded, or otherwise provided to yet another computing system for deployment and execution, or yet additional distribution.

Certain aspects described herein may be performed on a system such as shown in FIG. 8. Referring to FIG. 8, system 800 may be implemented within a single computing device or distributed across multiple computing devices or subsystems that cooperate in executing program instructions. The system 800 can include one or more blade server devices, standalone server devices, personal computers, routers, hubs, switches, bridges, firewall devices, intrusion detection devices, mainframe computers, network-attached storage devices, and other types of computing devices. The system hardware can be configured according to any suitable computer architectures such as a Symmetric Multi-Processing (SMP) architecture or a Non-Uniform Memory Access (NUMA) architecture.

The system 800 can include a processing system 810, which may include one or more processors and/or other circuitry that retrieves and executes software 820 from storage system 830. Processing system 810 may be implemented within a single processing device but may also be distributed across multiple processing devices or sub-systems that cooperate in executing program instructions.

Storage system(s) 830 can include any computer readable storage media readable by processing system 810 and capable of storing software 820. Storage system 830 may be implemented as a single storage device but may also be implemented across multiple storage devices or sub-systems co-located or distributed relative to each other. Storage system 830 may include additional elements, such as a controller, capable of communicating with processing system 810. Storage system 830 may also include storage devices and/or sub-systems on which data such as entity-related information is stored.

Software 820 may be implemented in program instructions and among other functions may, when executed by system 800 in general or processing system 810 in particular, direct the system 800 or processing system 810 to operate as described herein for a service 845 receiving communications associated with a productivity application such as described herein and performing certain functions including storing or managing content files.

System 800 may represent any computing system on which software 820 may be staged and from where software 820 may be distributed, transported, downloaded, or otherwise provided to yet another computing system for deployment and execution, or yet additional distribution.

In embodiments where the system 800 includes multiple computing devices, the server can include one or more communications networks that facilitate communication among the computing devices. For example, the one or more communications networks can include a local or wide area network that facilitates communication among the computing devices. One or more direct communication links can be included between the computing devices. In addition, in some cases, the computing devices can be installed at geographically distributed locations. In other cases, the multiple computing devices can be installed at a single geographic location, such as a server farm or an office.

A communication interface 850 may be included, providing communication connections and devices that allow for communication between system 800 and other computing systems (not shown) over a communication network or collection of networks (not shown) or the air.

Certain techniques set forth herein with respect to holographic augmented authoring may be described in the general context of computer-executable instructions, such as program modules, executed by one or more computing devices including holographic enabled devices. Generally, program modules include routines, programs, objects, components, and data structures that perform particular tasks or implement particular abstract data types.

Alternatively, or in addition, the functionality, methods and processes described herein can be implemented, at least in part, by one or more hardware modules (or logic components). For example, the hardware modules can include, but are not limited to, application-specific integrated circuit (ASIC) chips, field programmable gate arrays (FPGAs), system-on-a-chip (SoC) systems, complex programmable logic devices (CPLDs) and other programmable logic devices now known or later developed. When the hardware modules are activated, the hardware modules perform the functionality, methods and processes included within the hardware modules.

Embodiments may be implemented as a computer process, a computing system, or as an article of manufacture, such as a computer program product or computer-readable medium. Certain methods and processes described herein can be embodied as software, code and/or data, which may be stored on one or more storage media. Certain embodiments of the invention contemplate the use of a machine in the form of a computer system within which a set of instructions, when executed, can cause the system to perform any one or more of the methodologies discussed above. Certain computer program products may be one or more computer-readable storage media readable by a computer system and encoding a computer program of instructions for executing a computer process.

Computer-readable media can be any available computer-readable storage media or communication media that can be accessed by the computer system.

Communication media include the media by which a communication signal containing, for example, computer-readable instructions, data structures, program modules, or other data, is transmitted from one system to another system. The communication media can include guided transmission media, such as cables and wires (e.g., fiber optic, coaxial, and the like), and wireless (unguided transmission) media, such as acoustic, electromagnetic, RF, microwave and infrared, that can propagate energy waves. Although described with respect to communication media, carrier waves and other propagating signals that may contain data usable by a computer system are not considered computer-readable "storage media."

By way of example, and not limitation, computer-readable storage media may include volatile and non-volatile, removable and non-removable media implemented in any method or technology for storage of information such as computer-readable instructions, data structures, program modules or other data. Examples of computer-readable storage media include volatile memory such as random access memories (RAM, DRAM, SRAM); non-volatile memory such as flash memory, various read-only-memories (ROM, PROM, EPROM, EEPROM), phase change memory, magnetic and ferromagnetic/ferroelectric memories (MRAM, FeRAM), and magnetic and optical storage devices (hard drives, magnetic tape, CDs, DVDs). As used herein, in no case does the term "storage media" consist of carrier waves or propagating signals.

It should be understood that the examples and embodiments described herein are for illustrative purposes only and that various modifications or changes in light thereof will be suggested to persons skilled in the art and are to be included within the spirit and purview of this application.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. A system for holographic augmented authoring:
   a holographic-enabled device comprising at least a holographic display, a processor, storage media, a communication interface, a software component of a productivity application stored on the storage media, and a local copy of a content file stored on the storage media; and
   a second computing device comprising at least a second processor, second storage media, a second communication interface, the productivity application stored on the second storage media, and a second local copy of the content file stored on the second storage media,
   wherein the software component of the productivity application, when executed by the holographic-enabled device, directs the processor to:
      communicate to the second computing device, via a server, that an aspect of the content file or the productivity application is to be displayed by the second computing device;
   wherein the productivity application, when executed by the second computing device, directs the second processor to:
      in response to receiving a communication from the holographic-enabled device via the server that the aspect of the content file or the productivity application is to be displayed, display the aspect of the content file or the productivity application.

2. The system of claim 1, wherein the holographic-enabled device communicates with a service to update a master copy of the content file with changes made to the local copy of the content file by uploading a modified content file or an indication of what is changed to synchronize with the master copy of the content file at a remote storage location.

3. The system of claim 2, wherein the second computing device communicates with the service to update the master copy of the content file with changes made to the second local copy of the content file by uploading a corresponding modified content file or an indication of what is changed to synchronize with the master copy of the content file at the remote storage location.

4. The system of claim 2, wherein the second computing device displays a change to content in the modified content file according to the master content file stored at the remote storage location.

5. The system of claim 1, wherein the software component of the productivity application comprises instructions that direct the processor to:
   receive information corresponding to at least one of new or modified content, command features, application configuration, interface configuration, and layout features changed or removed at the second computing device.

6. The system of claim 1, wherein the indication of holographic mode comprises a request for holographic mode from the holographic-enabled device.

7. The system of claim 1, wherein the indication of holographic mode is a selection via user input to the second computing device of holographic mode from a menu of the productivity application.

8. A method performed by a holographic-enabled device comprising:
   providing at least one holographic authoring command corresponding to a semantic representation of an authoring command that can be enacted on at least one content component of a content file;
   in response to receiving an indication to execute a selected holographic authoring command from the at least one holographic authoring command, perform the selected holographic authoring command to modify the content file; and communicate a modified content file or an indication of what is changed to a second computing device.

9. The method of claim 8, further comprising:
receiving information corresponding to at least one of new or modified content, command features, application configuration, interface configuration, and layout features from the second computing device.

10. The method of claim 8, further comprising:
communicating to the second computing device that an aspect of the content file or the productivity application is to be displayed by the second computing device.

11. The method of claim 10, wherein the communicating is via one or more application programming interfaces (APIs).

12. The method of claim 8, further comprising:
in response to receiving a communication that an aspect of the content file or the productivity application is to be holographically displayed, displaying the aspect of the content file or the productivity application.

13. The method of claim 12, wherein the aspect of the content file or the productivity application comprises one or more of at least one content component of the content file, a command feature, or graphical icon.

14. The method of claim 8, wherein the selected holographic authoring command comprises a slide sort function and the content file comprises a presentation file of a presentation application having content components including at least slides,
wherein the semantic representation of the slide sort function comprises holographic images of each slide on a real surface in a surrounding environment of a user of the holographic-enabled device, the holographic images being rearrangeable on the real surface,
wherein a change in an arrangement of the holographic images corresponds to a modification to the order of the slides in the content file.

15. A holographic-enabled device comprising at least a holographic display, a processor, storage media, a communication interface; and at least a software component of a productivity application stored on the storage media, wherein the software component of the productivity application, when executed by the holographic-enabled device:
provides at least one holographic authoring command corresponding to a semantic representation of an authoring command that can be enacted on at least one content component of a content file;
in response to receiving an indication to execute a selected holographic authoring command from the at least one holographic authoring command, perform the selected holographic authoring command to modify the content file; and
communicate a modified content file or an indication of what is changed to a second computing device.

16. The holographic-enabled device of claim 15, wherein the software component of the productivity application, when executed by the holographic-enabled device, further directs the processor to:
in response to receiving a communication that an aspect of the content file or the productivity application is to be holographically displayed, display the aspect of the content file or the productivity application.

17. The holographic-enabled device of claim 16, wherein the aspect of the content file or the productivity application comprises one or more of at least one content component of the content file, a command feature, or graphical icon.

18. The holographic-enabled device of claim 15, wherein the software component of the productivity application, when executed by the holographic-enabled device, further directs the processor to:
communicate to the second computing device that an aspect of the content file or the productivity application is to be displayed by the second computing device, the second computing device providing a display separate from the holographic-enabled device.

19. The holographic-enabled device of claim 18, wherein the aspect of the content file or the productivity application comprises one or more of at least one content component of the content file, a command feature, or graphical icon.

20. The holographic-enabled device of claim 15, wherein the selected holographic authoring command comprises a slide sort function and the content file comprises a presentation file of a presentation application having content components including at least slides,
wherein the semantic representation of the slide sort function comprises holographic images of each slide on a real surface in a surrounding environment of a user of the holographic-enabled device, the holographic images being rearrangeable on the real surface,
wherein a change in an arrangement of the holographic images corresponds to a modification to the order of the slides in the content file.

\* \* \* \* \*